United States Patent Office 3,453,219
Patented July 1, 1969

3,453,219
PETROLEUM CRUDE OIL HYDROREFINING CATALYST
Mark J. O'Hara, Prospect Heights, Ill., assignor to Universal Oil Products Company, Des Plaines, Ill., a corporation of Delaware
No Drawing. Continuation-in-part of application Ser. No. 512,029, Dec. 6, 1965. This application Dec. 19, 1966, Ser. No. 602,575
Int. Cl. B01j *11/40*
U.S. Cl. 252—432       5 Claims

ABSTRACT OF THE DISCLOSURE

A novel catalytic composite comprising a metallic component, selected from the metals of Groups VIB and and VIII and their compounds, composited with a carrier of coprecipitated silica and alumina containing boron phosphate combined therewith while in the wet state, the silica and alumina being coprecipitated at a pH above about 8.0 from aqueous water glass and aluminum salt solutions. This catalyst is characterized by an apparent bulk density less than 0.35 gram/cc. and is useful as a crude oil hydrorefining catalyst.

RELATED APPLICATIONS

The present application is a continuation-in-part of my copending application, Ser. No. 512,029, now abandoned, filed Dec. 6, 1965, which, in turn, is a continuation-in-part of my copending application, Ser. No. 286,477, filed June 10, 1963, and now abandoned, all the teachings of which copending applications are incorporated herein be specific reference thereto.

APPLICABILITY OF INVENTION

The present invention relates to a novel catalytic composite especially adaptable for use in a process for hydrorefining or treating of petroleum crude oils. For present purposes, the term "crude oil" is intended to include full boiling range petroleum crudes, "topped" or "reduced" crude oil, atmospheric and vacuum tower bottoms products, heavy gas oils, cycle stocks, and the various heavy hydrocarbon fractions which are derived therefrom. More specifically, the catalyst of the present invention is intended for use in a process designed to eliminate and/or reduce the quantity of contaminating influences found in crude oils, and affords unexpected advantages through the effective removal of organo-metallic contaminants and in the conversion of asphaltics (insoluble in hydrocarbons such as pentane and heptane) into more valuable lower boiling hydrocarbons products.

Petroleum crude oils, regardless of the source thereof, contain nitrogenous and sulfurous compounds in relatively large quantities. In addition, crude oil is contaminated by detrimental amounts of high molecular weight organo-metallic complexes and asphaltic compounds. Organo-metallic complexes possess the tendency to exert deleterious effects upon most catalytic composites which may be employed in various processes to which the crude oil, or heavy hydrocarbon fraction, may be subjected. Of the organo-metallic contaminants, the most common are those containing nickel and/or vanadium, although other metals including iron, copper, lead, etc. are often present. The metals occur within the crude oil in a variety of forms: they may exist as metal oxide or sulfide scale; they may be present in the form of soluble salts; generally, however, they exist as metal complexes, such as porphyrins and derivatives thereof. Although those metallic contaminants existing in the form of oxide and/or sulfide scale, for example, may be removed by a relatively simple washing-filtering procedure, and the water-soluble salts are at least in part removable by water-washing followed by a subsequent dehydration technique, a much more severe treatment is required to remove the organo-metallic compounds, and to the extent that the resulting crude oil or heavy hydrocarbon fraction becomes suitable for further, subsequent processing. In addition to the organo-metallic compounds, petroleum crude oils contain greater quantities of sulfurous and nitrogenous compounds than are found in the lighter hydrocarbon fractions such as gasoline, kerosene, middle-distillate gas oils, etc. For example, a Wyoming sour crude oil having a gravity of about 23.2° API at 60° F., contains up to about 2.8% by weight of sulfur and 2700 p.p.m. of total nitrogen. The nitrogenous and sulfurous compounds may be at least in part converted, on being subjected to a treating or hydrorefining process, into hydrocarbons, ammonia, and hydrogen sulfide, the latter being readily removed from the system as a part of a gaseous phase. A suitable reduction in the concentration of the organo-metallic compounds is not as easily achieved, and to the extent that the crude oil may be subjected to further processing, particularly in a system which utilizes a catalytic composite. Notwithstanding that the total concentration of such organo-metallic compounds is relatively small, for example, often less than about 10 p.p.m., calculated as elemental metals, subsequent processing techniques will be adversely affected thereby. For example, when a topped petroleum crude oil having a concentration of organo-metallic compounds in excess of about 3.0 p.p.m., is subjected to a catalytic cracking process for the primary purpose of producing lower-boiling components, the metals become deposited upon the catalyst employed, steadily increasing in quantity until such time as the composition of the catalytic composite is changed to the extent that undesirable results are obtained. Similarly, the catalytic composite which may be utilized in a hydrorefining process, for the purpose of effecting the destructive removal of the nitrogenous and sulfurous compounds within the crude oil, experiences a composition change with a net result that the catalyst loses its activity and capability to convert the sulfurous and nitrogenous compounds into hydrogen sulfide, ammonia and hydrocarbons. That is to say, the composition of the catalytic composite, which is closely controlled with respect to the nature of the charge stock being processed and to the desired product quality and quantity, is changed considerably as a result of the deposition of the metallic contaminants onto the catalyst; the changed composite inherently results in different catalytic characteristics, and the desired object is extremely difficult to achieve. Such an effect is undesirable with respect to the catalytic cracking process, or other processes in which a catalytic composite performs an intended function, since the deposition of metallic contaminants on such catalyst tends to result in a lesser quantity of valuable liquid product and large quantities of hydrogen and coke, the latter producing a relatively rapid degree of catalyst deactivation. The presence of organo-metallic compounds, including the metal porphyrins and derivatives thereof, in lighter hydrocarbon charge stocks, will affect deleteriously other processes including catalytic reforming, isomerization, hydrodealkylation, hydrorefining, etc.

In addition to the organo-metallic compounds, and sulfurous and nitrogenous compounds, petroleum crude oils consist of a particular high molecular weight fraction which is predominantly asphaltics and other hydrocarbon-insoluble material. For example, the Wyoming sour crude oil previously described consists of about 8.37% by weight of pentane-insoluble asphaltics. These compounds are of a heavy hydrocarbonaceous nature, and function as coke-precursors having the tendency to become deposited within the reaction zone, onto the catalytic composite employed therein, in the form of a gummy hydrocarbonaceous residue. The deposition of this material may be considered as constituting a relatively large loss of charge stock, and it is, therefore, economically desirable to convert as much of said asphaltics into useful hydrocarbon oil fractions. In addition to effecting a substantial degree of removal of nitrogenous compounds, sulfurous compounds and virtually eliminating the organo-metallic compounds, the catalyst of the present invention, hereinafter described in greater detail, affords the additional advantage of converting pentane-insoluble asphaltics into pentane-soluble material without incurring the relatively rapid deposition of coke and other heavy hydrocarbonaceous material. It will be readily recognized that the overall effect is to increase the volumetric yield of useful normally liquid product by the amount of insoluble asphaltenes which are converted into the more valuable pentane-soluble hydrocarbon products.

The principal object of the present invention is, therefore, to provide a novel catalyst and useful process for hydrorefining heavy hydrocarbonaceous material, and particularly petroleum crude oils. The process of the present invention affords the opportunity to utilize a fixed-bed hydrorefining process, which type of process was heretofore not considered feasible due to the almost immediate deposition of coke, the rapid deactivation of the catalytic composite employed, and especially the inability of the catalyst to convert pentane-insoluble asphaltenes.

The present invention involves the preparation of a particular catalytic composite, utilizing a refractory inorganic oxide as the carrier material for the catalytically active metallic components; the catalytic composite permits effecting the hydrorefining process as a fixed bed system, as a moving-bed process, or a slurry-type process. The present process and catalyst yields a liquid hydrocarbon product more suitable for further processing, without experiencing the degree of difficulties otherwise resulting from the presence of the foregoing described contaminating influences. The process of the present invention is particularly advantageous for effecting the removal of organo-metallic compounds without significant product yield loss, and simultaneously converts pentane-insoluble material into pentane-soluble liquid hydrocarbon product; the catalyst of the present invention effects a degree of removal of nitrogenous compounds heretofore unobtainable due to the difficulty which present-day hydrorefining catalysts exhibit with respect to this particularly desired function when the charge stock also contains metallic contaminants and a significant amount of asphaltenes. Furthermore, the process of the present invention results in a greater degree of conversion to lighter-boiling hydrocarbon products.

Therefore, in a broad embodiment, the present invention relates to a hydrorefining catalyst comprising at least one metallic component selected from the group consisting of the metals of Groups VIB and VIII of the Periodic Table and compounds thereof, composited with an alumina-silica carrier material containing boron phosphate, said catalyst having an apparent bulk density less than about 0.35 gram/cc.

In another embodiment, the present invention affords a hydrorefining catalyst which comprises at least one metallic component selected from the group consisting of the metals of Groups VI–B and the Iron-group of the Periodic Table and compounds thereof, composited with an alumina-silica carrier material containing from about 13.0% to about 35.0% by weight of boron phosphate and having an apparent bulk density less than about 0.35 gram/cc. As hereinafter indicated in a specific example, the particularly preferred hydrorefining catalyst of the present invention comprises at least one decomposition product of a beta-diketone complex of the metals of Group VI–B having an atomic number greater than 24, and the Iron-group composited with a refractory inorganic oxide containing from about 13.0% to about 35.0% by weight of boron phosphate, the final catalyst having an apparent bulk density less than about 0.35 gram/cc.

PRIOR ART

Although it is recognized that the prior art abounds with teachings directed toward catalysis, catalytic composites and methods for manufacturing the same, as well as various uses therof, it is believed that the prior art methods and schemes are inapplicable to the conversion of asphaltic-containing charge stocks of the nature hereinbefore described. For example, U.S. Patent No. 2,938,001 teaches and claims a boron phosphate-containing catalyst. However, there is no recognition of the critical range of the concentration of boron phosphate, as discussed herein, and, there is no awareness of the need for a final catalyst having low apparent bulk density. As hereinafter indicated by specific example, these two aspects must be considered to successfully convert asphaltic charge stocks.

Similarly, U.S. Patent No. 3,169,931 teaches a process for utilizing aluminum sulfate as the source of the alumina in the preparation of a carrier material of alumina-silica, and solves the problem associated with low crushing strength otherwise resulting. Although this patent discloses a range of apparent bulk densities, in the sole instance of one falling within the presently claimed range, the carrier material was considered unacceptable due to a correspondingly low crushing strength. While the patent mentions boria as a possible component with the alumina, it too fails to recognize boron phosphate in a particular range.

In short, the prior art fails to recognize first the problem associated with asphaltic-containing charge stocks, and secondly the solution to the problem as is set forth and claimed in the present application.

SUMMARY OF INVENTION

From the foregoing described embodiments, it will be noted that the present invention is directed toward a catalytic composite having a particular composition, but utilizing those metals selected from Groups VI–B and VIII of the Periodic Table, and compounds thereof. Metals from Group VI–B and VIII of the Periodic Table are intended to include those indicated on the Periodic Chart of the Elements published by Fisher Scientific Company, 1953, and therefore, the catalyst of the present invention may comprise one or more metals from the group of molybdenum, tungsten, chromium, iron, nickel, cobalt, the noble metals, and particularly the platinum-group metals, etc. As hereinafter indicated in a specific example, the preferred hydrorefining catalyst comprises at least one decomposition product of a beta-diketone complex of particular metals from Groups VI–B and VIII. When the betadiketone complex comprises metals from Group VI–B, it is limited to those metals having an atomic number greater than 24; beta-diketone complexes, of chromium, such as chromium acetylacetonate decompose at temperatures greater than 310° C. the maximum decomposition temperature utilized when the source of active metallic components is one or more beta-diketone complexes. Other beta-diketone complexes decompose at lower temperatures to yield a more uniform and thoroughly impregnated catalytic composite. When the metal is selected from Group VIII of the Periodic Table, such metals will include decomposed beta-diketone complexes selected from the metals of the Iron-group, and, therefore, include iron, cobalt and nickel. Notwithstanding that the process of the present invention is conducted in the presence of hydrogen, the decomposition of the beta-diketone complex, such as molybdenum acetylacetonate, is effected in the absence thereof. Depending upon the particular beta-diketone complex selected as the source of the catalytically active metallic component, the barrier material will be impregnated with such metallic component either as the elemental metal, or as a lower oxide form thereof. In any event, it is understood that the stated concentrations are computed on the basis of the elemental metals. The decomposition of the beta-diketone complex is conducted at a temperature less than about 310° C. in order to avoid initial rupture of the catalyst structure during the decomposition, and to provide thorough, uniform penetration.

An essential feature of the inventive concept embodied by the present invention resides in the chemical characteristics of the carrier material utilized in the preparation of the catalytic composite, and in the physical characteristics of the latter. Briefly, the catalystic composite is prepared by initially forming a carrier material comprising one or more refractory inorganic oxides including alumina, silica, thoria, boria, strontia, hafnia, zirconia, etc. The preferred carrier material comprises a composite of alumina and from about 10.0% to about 90.0% by weight of silica, based upon the dry weight of alumina and silica, to which composite the boron phosphate is subsequently combined. The alumina-silica carrier material is prepared by coprecipitating the silica and alumina at a pH in the range of about 8.0 to about 10.0, or more. That is, for example, an aqueous solution of water glass may be intimately commingled with an aluminum salt solution, the resulting mixture being added to a suitable alkaline precipitant, such as ammonium hydroxide, or hexamethylenetetramine, to coprecipitate the hydrogel composite of alumina and silica. The gel is subjected to a water-washing-filtering technique for the purpose of removing sodium ions, and chloride ions if the initial hydrosol comprises aluminum chloride. The hydrogel is then reslurried in an aqueous solution of phosphoric and boric acids, the latter being utilized in a mol ratio of approximately 1:1, and in a total amount to yield a finished carrier material containing from about 13.0% to about 35.0% by weight of boron phosphate, on a dry basis. Following a drying technique at a temperature within the range of about 200° F. to about 400° F., or a spray drying procedure at a higher temperature level, the boron phosphate-containing carrier material is formed into the particularly desired size and/or shape and subsequently calcined in an atmosphere of air at a temperature within the range from about 800° F. to about 1400° F., or higher.

It has been found that a more suitable carrier material, for utilization in the preparation of the catalytic composite especially adaptable to a process for hydrorefining petroleum crude oils, is afforded when the coprecipitative reaction mixture is maintained at a pH within the range of about 8.0 to about 10.0 or higher. Although the precise change in the carrier material, as compared to that resulting from coprecipitation effected at a pH below about 8.0, and even at an acidic pH level below 7.0, is not known with accuracy, it is believed that the physical structure of the composite is more adaptable for the thorough penetration and even distribution of the catalytically active metallic components. The stated pH range may be maintained in any manner which achieves the desired result, either by commingling the entire mixture, for example, of water glass and the aluminum-containing hydrosol or solution with an excess quantity of ammonium hydroxide such that the final pH is above 8.0, or by the simultaneous, controlled addition of each stream to a vessel, the contents of which are initially in the stated pH range, the rates of each stream being controlled to maintain the pH within said range.

It has been found further that an alumina-silica carrier material, coprecipitated at a higher pH level, within the range of from about 8.0 to about 10.0 or higher, is made more effective as an integral component of a hydrorefining catalytic composite when the same has surface area characteristics indicating relatively large pore volume and pore diameter. In conjunction with high pore volume and high pore diameter, and as evidence thereof, is a relatively low apparent bulk density, expressed as grams/cc. I have now found that an unusually active hydrorefining catalyst is obtained, through the utilization of the boron phosphate-containing, alumina-silica carrier material when the finished catalyst has a low apparent bulk density. In the preparation of this new carrier material, it is believed that the boron phosphate is best incorporated into the alumina-silica structure prior to drying and the high-temperature calcination thereof, and in such a manner that aluminum polyorthophosphates are formed. Thus, as hereinabove set forth, the hydrogel of alumina and silica is subjected to a filtering technique for the purpose of removing excess, physically-held water, and immediately thereafter reslurried in an aqueous solution of phosphoric and boric acids in the desired concentrations. As hereinafter indicated in a specific example, a degree of criticality appears to be attached to the quantity of boron phosphate within the final carrier materials; that is, if the boron phosphate is present in an amount either less than 13.0% or more than 35.0% by weight of the total carrier material, the catalytic composite is less effective for the removal of contaminating influences than that catalyst in which the carrier material contains boron phosphate within the aforesaid range.

Therefore, the catalytic composite of the present invention is characterized by having an apparent bulk density within the range of about 0.15 to about 0.35 gram/cc., and utilizes a carrier material containing a particular quantity of boron phosphate. As hereinabove stated, the coprecipitated alumina-silica composite affords advantages as a component of the hydrorefining catalyst when coprecipitation is effected at a pH above about 8.0, compared to a composite which has been precipitated at an acidic pH below about 7.0. However, the high-pH precipitated material produces a final catalytic composite having an apparent bulk density of about 0.65 gram/cc., and, for the purposes of the present invention, the apparent bulk density must be decreased to a level below about 0.35 gram/cc. This may be accomplished during the formation of the catalyst by the method wherein the catalytically active components are coprecipitated with the carrier material, or after the same has been subjected to an initial drying technique for the primary purpose of removing the excess water of formation. For example, the apparent bulk density of the coprecipitative reaction mixture may be decreased from a level of about 0.65 gram/cc. to about 0.28 gram/cc. through the utilization of a water-extraction technique rather than the standard drying technique at a temperature within the range of 200° F. to about 400° F. The excess water is extracted from the coprecipitated material with a suitable oxygen-containing organic compound such as methanol, acetone, ethyl alcohol, propyl alcohol, isopropyl alcohol, etc. Following the water-extraction technique, the hydrogel may then be dried at a temperature within the range of about 200° F. to about 400° F. Through the proper selection of the aluminum-containing compound utilized as the source of alumina in the formation of the coprecipitative reaction mixture, the apparent bulk density thereof will be within the desired limits. For example, the use of an aqueous solution of aluminum nitrate, in conjunction with water glass, results in a finished catalytic composite having an apparent bulk density of about 0.33 gram/cc.

The catalytically active metallic components may be composited with the carrier material in any suitable manner resulting in the deposition of the desired quantity of the metals. For the purpose of the present invention, it is essential that the carrier material, prior to being combined with the active metallic components, have an apparent bulp density sufficiently low to insure that the subsequent incorporation of the metals will not cause the apparent bulk density sufficiently low to insure that the subsequent ample, the catalyst prepared from a low apparent bulk density, boron phosphate-containing carrier material, with which the metallic components are combined by way of the well-known impregnating techniques, with final catalyst having an ABD below 0.35 gram/cc., is a more effective catalyst than that prepared from a carrier material having a higher apparent bulk density, in which case the final ABD will also be higher, or one in which boron phosphate is not an integral component. The impregnation of the carrier material is most readily effected through the utilization of suitable water-soluble compounds of the desired metal or metals, and such suitable compounds include, although not by way of limitation, molybdic acid, ammonium molybdate, ammonium tungstate, nickel nitrate hexahydrate, cobalt nitrate hexahydrate, nickel chloride, cobalt chloride, etc. Where two or more metallic components are utilized, they may be incorporated in a single, or a successive impregnation with or without intermediate high temperature calcination. The final catalytic composite will contain from about 4.0% to about 30.0% by weight of a Group VI–B metal, and from about 1.0% to about 6.0% by weight of a Group VIII metal. As previously stated, and as hereinafter indicated by specific example, an unusually effective catalyst results when the catalytically active metallic components are combined with the carrier material through the use of beta-diketone complexes.

The process is effected, as hereinabove defined by reacting the petroleum crude oil, or other heavy hydrocarbon mixture, and hydrogen in contact with a catalytic composite prepared as hereinafter set forth. The charge stock and hydrogen mixture is heated to the operating temperature within the range of from about 225° C. to about 500° C., and contacts the catalyst under an imposed pressure of from about 500 to about 5000 p.s.i.g. The total reaction zone product effluent is passed into a suitable high-pressure, low-temperature separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light paraffinic hydrocarbons including methane, ethane and propane. Although the normally gaseous phase from the high-pressure separator may be treated for the purpose of removing the ammonia formed as a result of the destructive removal of nitrogenous compounds, a more convenient method is the introduction of water upstream from the high-pressure separator, removing said water and absorbed ammonia via suitable liquid level control means disposed in said high-pressure separator.

The following examples are presented for the purpose of illustrating the beneficial effects afforded a process for the hydrorefining of petroleum crude oils, through the utilization of a catalytic composite prepared in accordance with the method hereinbefore set forth. It is understood that the present invention is not intended to be limited, beyond the scope and spirit of the appended claims, to the operating conditions, reagents and/or concentrations as utilized within the examples. The petroleum crude oil utilized was a sour Wyoming crude having a gravity, °API at 60° F., of 22.0, and contained about 2700 ppm. of total nitrogen, about 2.8% of sulfur (calculated as the element) and 100 p.p.m. total metals (nickel and vanadium), the pentane-insoluble, asphaltic portion being in the amount of about 8.37% by weight.

EXAMPLE I

The two catalysts designated as catalysts "A" and "B" in the following Table I were evaluated, with respect to the hydrorefining of a petroleum crude oil, in an 1850 milliliter rocker-type autoclave. The tests were conducted by initially preparing a slurry of 20 grams of 60-mesh catalyst and 200 grams of the sour Wyoming crude oil, placing the mixture in the autoclave and pressuring the same to 100 atmospheres of hydrogen at room temperature. The hydrogen pressure increased to 200 atmospheres while the temperature was increased to a level of 400° C., being maintained at this level for a period of four hours. The total product effluent was subjected to centrifugal separation, the liquid portion being analyzed for the concentration of sulfurous and nitrogenous compounds remaining, and the quantity of nickel and vanadium.

Catalyst "B" was prepared by commingling 3260 grams of aluminum chloride hexahydrate dissolved in 3260 milliliters of water, with 354 grams of acidified N-brand water glass diluted with 354 grams of water. The mixture was added with vigorous stirring to 3400 milliliters of ammonium hydroxide, the final pH of the precipitated mixture being 8.2. The resultant hydrogel was filtered and washed free of sodium ions at a temperature of about 190° F. The filter cake was re-slurried with a phosphoric acid-boric acid solution consisting of 136 grams of boric acid in 750 milliliters of water, and 245 grams of an 87.0% by weight solution of phosphoric acid. The hydrogen slurry was then dried at a temperature of about 300° F. The surface area characteristics indicated a pore volume of 1.23 grams/cc., a pore diameter of about 125 Angstrom units and an apparent density of about 0.28 gram/cc. This carrier material consisted of 68.0% by weight of alumina, 12.0% by weight of silica and 22.0% by weight of boron phosphate. An impregnating solution was prepared utilizing 270 grams of an 85.0% by weight solution of molybdenum oxide dissolved in one liter of water and 225 milliliters of ammonium hydroxide; 95 grams of nickel nitrate hexahydrate dissolved in 85 milliliters of ammonium hydroxide completed the impregnating solution. The solution was utilized to impregnate 900 grams of the boron phosphate-containing alumina-silica carrier material hereinabove described, the resulting slurry being dried at a temperature of 250° F. and calcined in an atmosphere of air for a period of one hour at a temperature of 1100° F. The final apparent bulk density of the impregnated catalyst, containing 16.0% by weight of molybdenum and 2.0% by weight of nickel, calculated as the elements thereof, was 0.34 gram/cc.

Catalyst "A" was prepared in the same manner as catalyst "B" with but a single exception. The source of alumina was an aluminum chloride-containing hydrosol obtained by the hydrochloric acid digestion of aluminum metal, and having the same alumina equivalent as the aluminum chloride hexahydrate employed in the preparation of catalyst "B." The boron phosphate-containing carrier material indicated an apparent bulk density greater than 0.35 gram/cc., and following an impregnating procedure resulting in a catalytic composite containing 16.0% by weight of molybdenum and 2.0% by weight of nickel, calculated as the elements thereof, the apparent bulk density increased to a level of 0.73 gram/cc.

Both catalysts were subjected individually to the rocker-type autoclave test procedure hereinabove set forth. The results obtained with respect to the elimination of the contaminating influences are indicated in the following Table I:

TABLE I.—APPARENT BULK DENSITY COMPARISON

| Catalyst designation | A | B |
|---|---|---|
| Apparent bulk density, gram/cc | 0.73 | 0.34 |
| Liquid product, °API at 60° F | 34.50 | 36.80 |
| Sulfur, wt. percent | 0.06 | 0.10 |
| Nitrogen, p.p.m | 88.00 | 7.00 |
| Nickel, p.p.m | 0.12 | 0.04 |
| Vanadium, p.p.m | 0.16 | 0 |

Upon reference to the data presented in Table I, it will be readily ascertained that the catalyst of the present invention affords a much more attractive process for the hydrorefining of petroleum crude oils. The concentration of nitrogenous compounds was decreased from 88 p.p.m. to 7 p.p.m., while the total quantity of metals (nickel and vanadium) was decreased from 0.28 p.p.m. to 0.04 p.p.m. Of further significance is the fact that the liquid product effluent exhibited an API gravity, at 60° F., of 36.8 as compared to the 34.5 resulting from the utilization of catalyst "A." This is indicative of the production of a greater quantity of lower-boiling hydrocarbon products, and particularly the conversion of pentane-insoluble asphaltenes into pentane-soluble hydrocarbon products.

EXAMPLE II

Three additional catalysts were prepared utilizing an aluminum chloride salt solution prepared from aluminum chloride hexahydrate dissolved in water and N-brand water glass, the mixture being coprecipitated with ammonium hydroxide, filtered and subjected to a washing technique to remove sodium ions. The resulting hydrogel was dried at a temperature of 250° F. for a period of about 12 hours, the dried hydrogel being separated into three individual portions. Each portion of the hydrogel was then reslurried with a phosphoric acid-boric acid crystal solution of a concentration such that catalyst "C" contained 12.0% by weight of boron phosphate, catalyst "D" contained 22.0% by weight of boron phosphate and catalyst "E" contained 36.0% by weight thereof. Each portion of the boron phosphate-containing carrier material was impregnated with a solution of molybdic acid and nickel nitrate hexahydrate of sufficient quantity to result in the deposition of 16.0% by weight of molybdenum and 2.0% by weight of nickel, calculated as the elements thereof, within each of the three catalyst portions. Each of the impregnated carrier materials was dried for a period of two hours at a temperature of 250° F., and thereafter oxidized in an atmosphere of air for a period of one hour at a temperature of 1100° F.

Each catalyst portion was individually subjected to the rocker-type autoclave test procedure previously described with respect to the foregoing Example I. The results of the analyses performed on the liquid product effluent are given in the following Table II:

TABLE II.—CONCENTRATION OF BORON PHOSPHATE

| Catalyst designation | C | D | E |
|---|---|---|---|
| Boron phosphate, wt. percent | 12.0 | 22.0 | 36.0 |
| Liquid product gravity, ° API | 35.3 | 35.8 | 33.9 |
| Sulfur, wt. percent | 0.06 | 0.06 | 0.11 |
| Total nitrogen, p.p.m. | 78.0 | 43.0 | 152.0 |
| Pentane-insolubles, wt. percent | 0.18 | 0.10 | 0.21 |

As noted in the foregoing Table II, the three catalysts portions contain varying quantities of boron phosphate; catalyst "C" containing 12.0% by weight of boron phosphate resulted in a total nitrogen content of 78 p.p.m., and catalyst "E" a total nitrogen content of 152 p.p.m. Both of these catalysts contain quantities of boron phosphate outside the limits imposed on the concentration thereof within the alumina-silica composite. Catalyst "D," containing 22.0% by weight of boron phosphate within the carrier material, resulted in a liquid product effluent having a total nitrogen content significantly less than either of the other catalysts. Furthermore, catalyst "D," produced a liquid product having fewer pentane-insoluble asphaltics and, as evidenced by the increased gravity in °API, a greater concentration of lower-boiling hydrocarbon products. The seeming discrepancy between the total nitrogen concentrations with respect to catalysts "B" and "D" results from the use of boric acid crystals in the preparation of the latter, whereas boric acid powder was used to prepare the former. However, the comparison of catalysts "C," "D" and "E" is valid since all three were prepared using crystals of boric acid.

The foregoing specification and specific examples indicate clearly the inventive concept embodied by the present invention, and the unusual benefits afforded a process for the hydrorefining of petroleum crude oils and the heavier hydrocarbon fractions derived therefrom.

I claim as my invention:

1. A crude oil hydrorefining catalyst which comprises at least one metallic component selected from the group consisting of the metals of Groups VI–B and VIII of the Periodic Table, and compounds thereof, composited with a carrier material of coprecipitated alumina and silica containing boron phosphate combined therewith while in the wet state, said carrier material being characterized in that the alumina and silica are coprecipitated at a pH of at least about 8.0 from aqueous aluminum salt and water glass solutions, said catalyst further characterized in that the apparent bulk density thereof is less than 0.35 gram/cc.

2. The catalyst of claim 1 further characterized in that said metallic component comprises nickel and molybdenum.

3. The catalyst of claim 1 further characterized in that said carrier material is a composite of coprecipitated alumina and silica, and from about 13.0% to about 35.0% by weight of boron phosphate.

4. The catalyst of claim 1 further characterized in that said apparent bulk density is within the range of from about 0.15 to about 0.35 gram/cc.

5. The catalyst of claim 1 further characterized in that the carrier material has impregnated therewith from 1.0% to about 6.0% by weight of nickel and from 6.0% to about 30.0% by weight of molybdenum.

References Cited

UNITED STATES PATENTS

| 2,878,180 | 3/1959 | Watkins | 252—432 X |
| 2,938,001 | 5/1960 | De Rosset | 252—432 |
| 3,169,918 | 2/1965 | Gleim | 208—216 X |
| 3,169,931 | 2/1965 | De Rosset et al. | 252—453 |

DANIEL E. WYMAN, *Primary Examiner.*

C. F. DEES, *Assistant Examiner.*

U.S. Cl. X.R.

252—437, 453